United States Patent
Maute et al.

(10) Patent No.: US 9,987,716 B2
(45) Date of Patent: Jun. 5, 2018

(54) MACHINE TOOL BRAKE DEVICE

(71) Applicant: Robert Bosch GmbH, Stuttgart (DE)

(72) Inventors: Joerg Maute, Sindelfingen (DE);
Florian Esenwein,
Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 521 days.

(21) Appl. No.: 14/159,163

(22) Filed: Jan. 20, 2014

(65) Prior Publication Data
US 2014/0206264 A1    Jul. 24, 2014

(30) Foreign Application Priority Data
Jan. 21, 2013 (DE) ........................ 10 2013 200 865

(51) Int. Cl.
| | |
|---|---|
| B24B 23/02 | (2006.01) |
| F16D 63/00 | (2006.01) |
| B60T 1/00 | (2006.01) |
| B60T 1/06 | (2006.01) |
| F16D 121/20 | (2012.01) |

(52) U.S. Cl.
CPC ............ *B24B 23/022* (2013.01); *B24B 23/02* (2013.01); *B24B 23/028* (2013.01); *B60T 1/005* (2013.01); *B60T 1/062* (2013.01); *F16D 63/002* (2013.01); *F16D 63/006* (2013.01); *F16D 2121/20* (2013.01)

(58) Field of Classification Search
CPC ..... B24B 23/02; B24B 23/022; B24B 23/028; B60T 1/005; B60T 1/062; F16D 63/002; F16D 63/006; F16D 2121/20
USPC ........................................................ 451/358
See application file for complete search history.

(56) References Cited

U.S. PATENT DOCUMENTS

| | | | | |
|---|---|---|---|---|
| 3,101,542 A | * | 8/1963 | Fodor ........................... | 433/105 |
| 3,611,770 A | * | 10/1971 | Kralowetz ........................ | 72/76 |
| 3,670,456 A | * | 6/1972 | Harratt ........................... | 451/151 |
| 3,738,461 A | * | 6/1973 | Brooks et al. ............ | 192/18 B |
| 5,337,862 A | * | 8/1994 | Kuwahara ..................... | 188/158 |
| 2009/0127949 A1 | * | 5/2009 | Zhang et al. .................... | 310/77 |
| 2009/0145700 A1 | * | 6/2009 | Lin ................................. | 188/67 |
| 2013/0284551 A1 | * | 10/2013 | Nadig et al. .................. | 188/267 |

(Continued)

FOREIGN PATENT DOCUMENTS

| | | |
|---|---|---|
| CN | 1153873 A | 7/1997 |
| CN | 1239912 A | 12/1999 |

(Continued)

*Primary Examiner* — Eileen Morgan
(74) *Attorney, Agent, or Firm* — Maginot, Moore & Beck LLP

(57) ABSTRACT

A machine tool brake device of a portable machine tool includes at least one magnetic-field-type brake unit that is configured to brake a spindle and/or a machining tool when the magnetic-field-type brake unit is in at least one braking position. The machine tool brake device further includes at least one spindle immobilization unit that is configured to immobilize the spindle when the spindle immobilization unit is in at least one immobilization position. The machine tool brake device also includes at least one activation unit that is configured to transfer the magnetic-field-type brake unit into the braking position and to enable an automatic transfer of the spindle immobilization unit into the immobilization position.

11 Claims, 7 Drawing Sheets

(56) References Cited

U.S. PATENT DOCUMENTS

2013/0288581 A1* 10/2013 Esenwein ..................... 451/363
2014/0034434 A1*  2/2014 Esenwein ..................... 188/267
2014/0069756 A1*  3/2014 Esenwein ..................... 188/324

FOREIGN PATENT DOCUMENTS

| CN | 101254588 A | | 9/2008 |
|---|---|---|---|
| CN | 201423633 Y | | 3/2010 |
| CN | 102335910 A | | 2/2012 |
| CN | 103189166 A | | 7/2013 |
| JP | 2006-142406 A | | 6/2006 |
| WO | WO2012/055653 | * | 9/2011 |

* cited by examiner

MACHINE TOOL BRAKE DEVICE

This application claims priority under 35 U.S.C. § 119 to patent application no. DE 10 2013 200 865.1 filed on Jan. 21, 2013 in Germany, the disclosure of which is incorporated herein by reference in its entirety.

BACKGROUND

Machine tool brake devices of portable machine tools are already known which comprise a magnetic-field-type brake unit for braking a spindle and/or a machining tool when the magnetic-field-type brake unit is in at least one braking position and comprise a spindle immobilization unit for immobilizing the spindle when the spindle immobilization unit is in at least one immobilization position. The spindle immobilization unit can in this case be manually actuated by an operator.

SUMMARY

The disclosure is based on a machine tool brake device of a portable machine tool, having at least one magnetic-field-type brake unit for braking a spindle and/or a machining tool when the magnetic-field-type brake unit is in at least one braking position and having at least one spindle immobilization unit for immobilizing the spindle when the spindle immobilization unit is in at least one immobilization position.

It is proposed that the machine tool brake device comprises at least one activation unit which is provided for transferring the magnetic-field-type brake unit at least into the braking position and for enabling at least an automatic transfer of the spindle immobilization unit into the immobilization position. Here, a "magnetic-field-type brake unit" is to be understood in particular to mean a brake unit, in particular an electromagnetic brake unit, which reduces and/or limits a speed, in particular a rotational speed, of a moving component, in particular of a rotating component, relative to a working speed in an at least substantially frictionless manner by utilizing a magnetic field, in particular in addition to a purely friction-induced reduction and/or limitation of the speed owing to a bearing arrangement of the component. Here, "substantially frictionless reduction and/or limitation" is to be understood in particular to mean braking of a component which takes place in a manner free from friction forces, aside from bearing-induced friction forces and/or flow-induced resistance forces. In particular, the braking of the component by means of the magnetic-field-type brake unit takes place in a manner decoupled from a region of contact between the component and a brake element, in particular a friction pad of a brake element. It is however basically also conceivable here for a friction brake unit which is coupled to or decoupled from the magnetic-field-type brake to be provided in addition to the at least substantially frictionless magnetic-field-type brake unit.

The magnetic-field-type brake unit is advantageously in the form of an eddy-current brake. Here, an "eddy-current brake" is to be understood in particular to mean a brake which utilizes eddy-current losses of a metallic element, which is moved in a magnetic field, in order to brake the element. For the configuration of the magnetic-field-type brake unit as an eddy-current brake, it is preferable for an eddy-current disk composed of an electrically advantageously conductive material, such as for example copper and/or aluminum, to be arranged between the at least two permanent magnets. Here, the expression "between" should be understood in particular to mean a spatial arrangement in which components are arranged one behind the other at least along an axis and, as viewed along the axis, at least partially overlap. It is however also conceivable, in an alternative configuration of the machine tool brake device according to the disclosure, for the magnetic-field-type brake unit to be in the form of a hysteresis brake. Here, a "hysteresis brake" should be understood in particular to mean a brake which generates a braking force and/or a braking torque by means of alternating magnetization of an element moving in a magnetic field, in particular of a ferromagnetic element. For the configuration of the magnetic-field-type brake unit as a hysteresis brake, it is preferable for a brake element, formed from a ferromagnetic material, of the magnetic-field-type brake unit to be arranged between the at least two permanent magnets.

Furthermore, the magnetic-field-type brake unit is in particular in the form of a magnetic-field-type brake unit which is separate from a drive. A "magnetic-field-type brake unit which is separate from a drive" is to be understood here in particular to mean a magnetic-field-type brake unit which generates braking of a component by means of a magnetic field in a manner decoupled from a magnetic field of a drive unit in the form of an electric motor unit. It is preferable for a stator and/or a rotor of the electric motor unit to be decoupled from the magnetic field of the magnetic-field-type brake unit. The magnetic-field-type brake unit is preferably provided for braking the component from a working speed in particular to a speed of less than 50% of the working speed, preferably to a speed of less than 20% of the working speed and particularly preferably to a speed of 0 m/s, in a time period of greater than 0.1 s, preferably greater than 0.5 s and particularly preferably less than 3 s. "Provided" is to be understood in particular to mean specially configured and/or specially equipped. Here, a "braking position" should be understood in particular to mean a position of the brake element and/or of the counterpart brake element in which at least a braking force for a reduction of a speed of a moving component in particular by at least more than 50%, preferably by at least more than 65% and particularly preferably by at least more than 80% in a predetermined time period is exerted on the moving component in at least one operating state. Here, the predetermined time period is in particular less than 5 s.

The expression "released position" is intended here in particular to define a position of the brake element and/or of the counterpart brake element in which an action of the braking force on the moving component for a reduction of the speed is at least substantially eliminated. The mechanical brake unit is preferably provided for braking the component from a working speed in particular to a speed of less than 50% of the working speed, preferably to a speed of less than 20% of the working speed and particularly preferably to a speed of 0 m/s, in a predetermined time period of greater than 0.1 s, preferably greater than 0.5 s and particularly preferably less than 3 s.

The expression "spindle immobilization unit" is intended here in particular to define a unit which, at least in an immobilization position, prevents a movement of a spindle, in particular a rotational movement of the spindle, in particular aside from a play-induced and/or tolerance-induced movement capability of the spindle, in order for a machining tool to be fastened to and/or on the spindle and/or in order for the machining tool to be released from the spindle, for example during an exchange of a machining tool. The spindle immobilization unit is particularly preferably in the form of a so-called spindle lock unit.

The activation unit is preferably in the form of a mechanical activation unit. Here, a "mechanical activation unit" is to be understood in particular to mean a unit which, as a result of a relative movement, initiates a triggering process and/or an activation process, in particular of the magnetic-field-type brake unit, wherein the relative movement differs from a pure switching movement of a switching element for generating an electrical signal and is formed in particular by a movement of a magnet element and/or by an inertia-induced movement, in particular by an inertia-induced movement of a rotating drive element, of a drive output element and/or of a machining tool. In this context, a "triggering process" is to be understood in particular to mean a mechanical, electrical, magnetic and/or electronic signalization of a state provided for the initiation of an activation process. An "activation process" is to be understood here in particular to mean a mechanical, electrical, magnetic and/or electronic activation of the magnetic-field-type brake unit for the purpose of generating forces and/or torques for braking a component.

In a preferred embodiment of the machine tool brake device according to the disclosure, the activation unit is provided for initiating the triggering process and the activation process, in particular at least substantially without a time delay, as a result of the relative movement. Here, the activation unit may be provided, for example, for signaling a triggering process, and at least substantially simultaneously initiating an activation process of the magnetic-field-type brake unit, as a result of the relative movement. Likewise conceivable is a configuration of the mechanical activation unit in which, as a result of the relative movement as triggering process, a switch is actuated and an activation process is initiated which follows the triggering process and which is effected by means of an actuator and/or a spring force and/or by means of other actuation elements that appear expedient to a person skilled in the art. Furthermore, it is likewise conceivable for the activation unit to comprise a sensor unit which senses the relative movement and initiates the triggering process as a result, wherein the activation process is initiated for example by means of an actuator.

A further configuration according to the disclosure of the machine tool brake device may consist in that the activation unit is connected mechanically, electrically, magnetically and/or electronically to an electromagnet of the magnetic-field-type brake unit, wherein the electromagnet is provided such that, in at least one operating mode, it influences a magnetic field of the magnetic-field-type brake unit. The electromagnet can generate a magnetic field additional to an already existing magnetic field of the magnetic-field-type brake unit. Here, it is conceivable that, in a working mode, the additional magnetic field at least partially compensates at least magnetic forces of the already existing magnetic field of the magnetic-field-type brake unit and/or at least partially attenuates said at least magnetic forces in relation to a strength of the magnetic force of the magnetic field in a braking mode. The electromagnet of the magnetic-field-type brake unit may advantageously likewise be provided such that, during a start-up of an electric motor unit of the portable machine tool, in an operating mode, it permits an additional torque for the attainment of a working rotational speed of the electric motor unit in a short period of time, such as is preferable for attaining boost operation.

It is particularly preferable for the magnetic-field-type brake unit, the spindle immobilization unit and the activation unit together to form an assembly module. Here, the expression "assembly module" is intended in particular to define a structure of a unit in which multiple components are pre-assembled and the unit is installed as a whole in an overall system, in particular in a portable machine tool. The assembly module preferably has at least one fastening element which is provided for detachably connecting the assembly module to the overall system. It is advantageously possible for the assembly module to be dismounted from the overall system in particular using less than 10 fastening elements, preferably using less than 8 fastening elements and particularly preferably using less than 5 fastening elements. The fastening elements are particularly preferably in the form of screws. It is however also conceivable for the fastening elements to be in the form of other elements that appear expedient to a person skilled in the art, for example quick-action clamping elements, fastening elements that can be actuated without tools, etc. It is preferable for at least one function of the assembly module to be ensured in a state in which it is dismounted from the overall system. The assembly module can particularly preferably be dismounted by an end user. The assembly module is thus in the form of an exchangeable unit which can be replaced with a further assembly module, for example in the event of a defect of the assembly module or in the event of a functional upgrade and/or functional modification of the overall system. By means of the configuration according to the disclosure, it is advantageously possible to realize a compact machine tool brake device with a magnetic-field-type brake unit and with a spindle immobilization unit. It is advantageously possible to save on installation space, components and assembly outlay. Furthermore, a high level of operating comfort can advantageously be attained.

It is also proposed that the activation unit comprises at least one activation element arranged on the spindle. By means of the configuration according to the disclosure, particularly reliable activation of the magnetic-field-type brake unit and of the spindle immobilization unit can advantageously be made possible. It is thus advantageously possible for a risk of injury of an operator in the event of detachment of the machining tool arranged on the spindle to be kept low.

It is also proposed that the activation unit comprises at least one activation element which is mounted on the spindle so as to be rotatable relative to the spindle along at least an angle range of less than 360°. The activation element is preferably mounted on the spindle so as to be rotatable relative to the spindle along at least an angle range of less than 270° and particularly preferably along at least an angle range of less than 180°. Here, the activation element may be rotatably mounted directly on the spindle or may be arranged on an element which is rotatably mounted on the spindle. The element may be mounted rotationally conjointly on the spindle and comprise, for example, circular-arc-shaped guide tracks in which the activation element is movably mounted, or the activation element is formed integrally with the element and is mounted on the spindle, together with the element, so as to be rotatable relative to the spindle. The activation element is preferably mounted so as to be rotatable relative to the spindle about an axis of rotation running coaxially with respect to an axis of rotation of the spindle. It is however also conceivable for the activation element to be mounted so as to be rotatable about an axis of rotation running at least substantially parallel to the axis of rotation of the spindle. Here, "substantially parallel" is to be understood in particular to mean an orientation of a direction relative to a reference direction, in particular in a plane, wherein the direction has a deviation relative to the reference direction in particular of less than 8°, advantageously less than 5° and particularly advantageously less than 2°. By means of the configuration according to the disclosure of the machine tool brake device, it is advantageously possible for a relative movement between the activation element and the spindle to be utilized in order to activate the magnetic-field-type brake unit and effect braking of the spindle. It is thus advantageously possible to achieve a fast response of the magnetic-field-type brake unit, which is directly dependent on a movement of the spindle.

It is also proposed that the activation unit is provided for changing at least a position of one brake element of the magnetic-field-type brake unit relative to a further brake element of the magnetic-field-type brake unit. It is preferable for the brake element and the further brake element to be in the form of permanent magnets. Thus, the activation unit is preferably provided for changing a polarity of the brake element in permanent magnet form relative to the further brake element in permanent magnet form. The two brake elements in the form of permanent magnets are thus preferably mounted so as to be movable relative to one another, in particular are mounted so as to be rotatable relative to one another. The permanent magnets are preferably formed from rare-earth magnets such as for example neodymium-iron-boron (NdFeB), samarium-cobalt (SmCo) etc. It is however also conceivable for the permanent magnets to be formed from some other material that appears expedient to a person skilled in the art. The permanent magnets are preferably of circular form. Furthermore, the permanent magnets preferably have angle segments which are arranged along a circumferential direction and which have alternating polarity along the circumferential direction. Here, the expression "changing polarity" is intended to define in particular a change of a position of poles of the permanent magnet relative to poles of the further permanent magnet. The permanent magnets are preferably rotationally offset relative to one another about an axis, in particular by an angle corresponding to a pole pitch of the permanent magnets. A "pole pitch" is to be understood in particular to mean a division of a distance, in particular of a circumference of 360°, of the permanent magnets into pole segments, in particular angle segments with one polarity, of the permanent magnets arranged one behind the other uniformly along a direction, in particular the circumferential direction, wherein the pole segments have an alternating polarity relative to one another along the direction. The poles are preferably arranged offset relative to one another along the circumferential direction. Here, the poles are preferably arranged so as to adjoin one another. It is however also conceivable for the poles to be arranged spaced apart from one another, in particular along the circumferential direction. A braking force can be generated advantageously by means of the configuration according to the disclosure. Furthermore, in the case of a configuration of the brake elements as permanent magnets, a variation of the magnetic field, such as is provided for realizing braking of a moving component, can be generated in a structurally simple manner.

It is furthermore proposed that the spindle immobilization unit comprises at least one entrainment element which is provided for moving at least one spindle immobilization element of the spindle immobilization unit. The entrainment element preferably moves the spindle immobilization element relative to the activation element as a result of a relative movement between the entrainment element and the activation element. Here, the spindle immobilization element preferably has at least one movement component running at least substantially perpendicular to an axis of rotation of the entrainment element and/or of the activation element, in particular radially with respect to the axis of rotation. Here, for the purpose of immobilizing the spindle in the immobilization position, it is preferable for the spindle immobilization element to be clamped between a clamping element of the spindle immobilization unit and the entrainment element. The clamping element is preferably arranged outside the spindle immobilization element as viewed along a direction extending at least substantially perpendicular to an axis of rotation of the entrainment element and/or of the activation element proceeding from the axis of rotation of the entrainment element and/or of the activation element. The clamping element preferably surrounds the entrainment element and/or the spindle immobilization element along the circumferential direction. Here, the clamping element is advantageously of circular-ring-shaped form, for example of hollow cylindrical form, in the form of a clamping drum etc. The entrainment element is preferably part of the magnetic-field-type brake unit and part of the spindle immobilization unit. A structurally simple activation of the spindle immobilization unit can be attained advantageously by means of the configuration according to the disclosure.

It is also proposed that the spindle immobilization unit comprises at least one entrainment element which has at least one clamping contour for clamping at least one spindle immobilization element of the spindle immobilization unit. The clamping contour preferably extends along the circumferential direction on an outer circumference of the entrainment element. It is however also conceivable for the clamping contour to be arranged on the entrainment element at some other position that appears expedient to a person skilled in the art. A compact configuration of the machine tool brake device can advantageously be obtained by means of the configuration according to the disclosure.

It is also proposed that the spindle immobilization unit comprises at least one spindle immobilization element which is in the form of a rolling element. Here, a "rolling element" is to be understood in particular to mean an element which is of rotationally symmetrical form at least about one axis, in particular an axis of rotation. In particular, the rolling element is provided such that, at least in an operating state, as a result of a rotational movement about the axis of rotation, it rolls by way of at least one surface, in particular a shell surface, on a surface of a component. The rolling element is preferably in the form of a cylinder. It is however also conceivable for the rolling element to be in the shape of a ball, a cone, a barrel or some other rotary body that appears expedient to a person skilled in the art. It is advantageously possible for a rolling movement of the rolling element to be utilized for attaining an immobilization position of the spindle immobilization unit. Furthermore, it is advantageously possible to realize low frictional resistance during a transfer of the spindle immobilization unit into the immobilization position.

It is furthermore proposed that the machine tool brake device comprises at least one drive output unit which comprises at least one drive output element on which at least one activation element of the activation unit is arranged for the purpose of transferring the magnetic-field-type brake unit into the braking position. Here, the activation element is preferably connected rotationally conjointly to the drive output element. "Rotationally conjointly" is to be understood in particular to mean a connection which, averaged over one full rotation, transmits a power flow with an unchanged torque, an unchanged direction of rotation and/or an unchanged rotational speed. The activation element is particularly preferably formed integrally with the drive output element. "Integrally" is to be understood in particular to mean at least cohesively connected, for example by means of a welding process, an adhesive bonding process, an injection process and/or some other process that appears expedient to a person skilled in the art, and/or advantageously formed in one piece, for example by production from one casting and/or by production in a single-component or multi-component injection molding process and advantageously from a single blank. The drive output element is preferably in the form of a gearwheel, in particular a crown gear, of the drive output unit. Here, the drive output element is supported with one side on the entrainment element. With a side facing away from the entrainment element, the drive output element can be supported on a further activation element of the activation unit, on a lock ring arranged on the spindle, or on a drive element in the form of a pinion. Here, a "drive output unit" is to be understood in particular to mean a unit which can be driven by means of a drive unit of a portable machine tool and which transmits forces and/or torques generated by the drive unit to a machining tool and/or to a tool holder of a portable machine tool. The drive output unit is preferably in the form of an angular gear. Here, an "angular gear" is to be understood in particular to mean a gearing which, for a transmission of forces and/or torques, has an axis of rotation of an output element arranged at an angle relative to an axis of rotation of an input element, wherein the axis of rotation of the input element and the axis of rotation of the output element preferably has a common point of intersection. Here, "arranged at an angle" is to be understood in particular to mean an arrangement of one axis relative to a further axis, in particular of two intersecting axes, wherein the two axes enclose an angle not equal to 180°. The axis of rotation of the input element and the axis of rotation of the output element preferably enclose an angle of 90° when the drive output unit in the form of an angular gear is in an assembled state. A compact arrangement of the magnetic-field-type brake unit and of the spindle immobilization unit, which can advantageously act on one drive output element, can be obtained in a structurally simple manner by means of the configuration according to the disclosure.

It is also proposed that the activation unit comprises at least one further activation element, arranged on the drive output element, at least for the purpose of enabling a movement capability of a spindle immobilization element of the spindle immobilization unit. The further activation element is preferably connected rotationally conjointly to the drive output element. The further activation element is particularly preferably formed integrally with the drive output element. It is thus advantageously possible for a compact spindle immobilization unit to be realized. Furthermore, reliable activation of the spindle immobilization unit can advantageously be realized, said spindle immobilization unit being independent of a spindle immobilization activation element that can be actuated manually by an operator.

Furthermore, the disclosure is based on a portable machine tool having a machine tool brake device according to the disclosure. Here, a "portable machine tool" should be understood in particular to mean a machine tool for machining workpieces, which machine tool can be transported by an operator without the use of a transportation machine. In particular, the portable machine tool has a mass of considerably less than 40 kg, preferably less than 10 kg and particularly preferably less than 5 kg. The portable machine tool is preferably in the form of an angle grinder. It is however also conceivable for the portable machine tool to be of some other configuration that appears expedient to a person skilled in the art, for example a configuration as a circular saw, as a drill, as a drilling and/or chipping hammer, as a gardening implement etc. A high level of operating comfort for an operator of the portable machine tool can advantageously be obtained by means of the configuration according to the disclosure, because it is possible in particular for untrue start-up to advantageously be ensured by means of a movement of the brake element in the direction of the entrainment element upon a start of operation of the portable machine tool.

Here, it is not the intention for the machine tool brake device according to the disclosure and/or the machine tool according to the disclosure to be restricted to the application and embodiment described above. In particular, the machine tool brake device according to the disclosure and/or the machine tool according to the disclosure may, in order to fulfill a function described herein, have a number of individual elements, components and units that deviates from the number stated herein.

BRIEF DESCRIPTION OF THE DRAWINGS

Further advantages will emerge from the following description of the drawings. The drawings illustrates exemplary embodiments of the disclosure. The drawings, the description and claims contain numerous features in combination. A person skilled in the art will expediently also consider the features individually, and combine these to form further meaningful combinations.

In the drawings.

DETAILED DESCRIPTION

Figure 1:
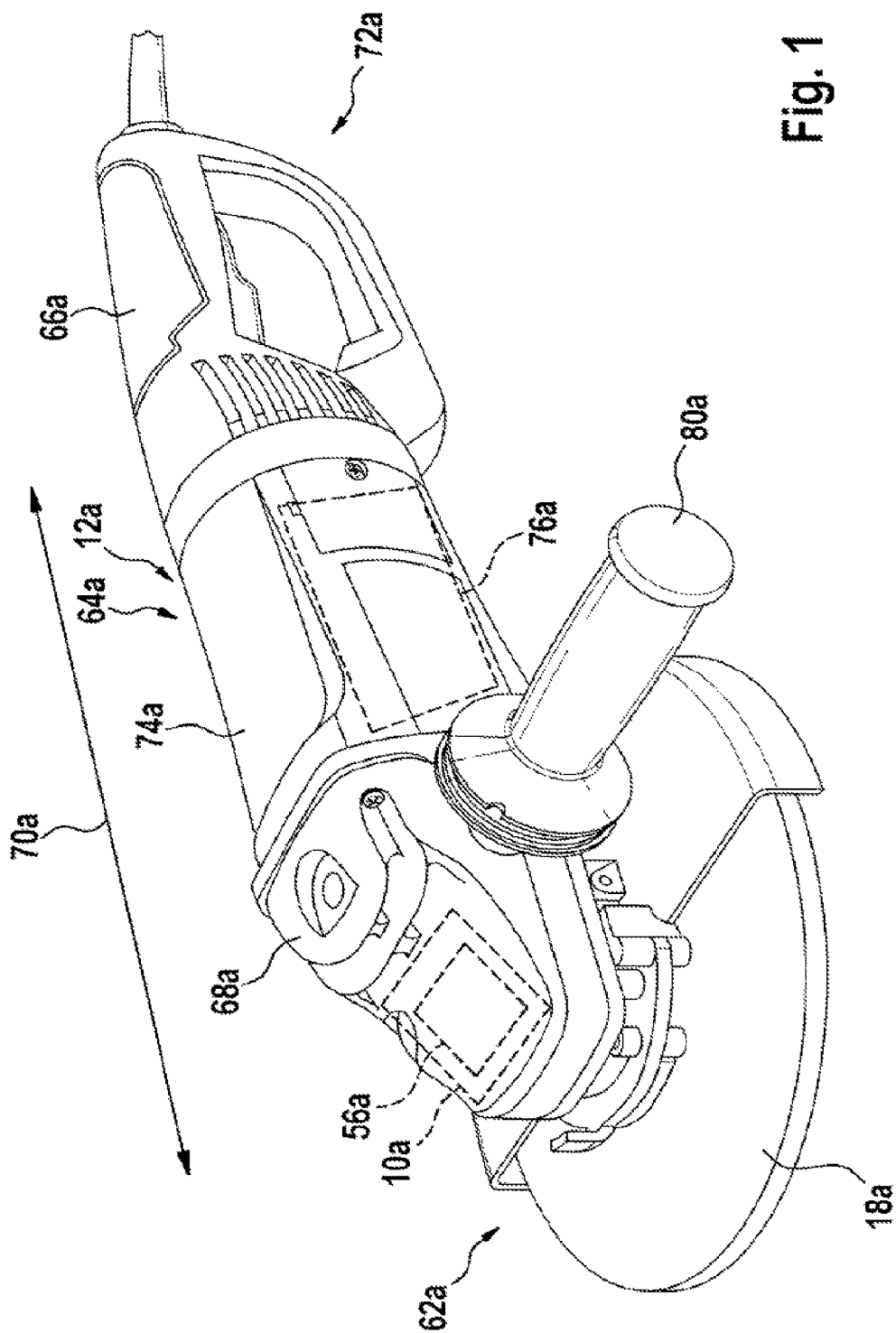
FIG. 1 shows, in a schematic illustration, a machine tool according to the disclosure having a machine tool brake device according to the disclosure.

FIG. 1 shows a portable machine tool 12a which is in the form of an angle grinder and which has a machine tool brake device 10a. The machine tool brake device 10a is thus in the form of a handheld machine tool brake device. The portable machine tool 12a comprises a protective hood unit 62a, a machine tool housing 64a and a main handle 66a. The main handle 66a extends from a gearing housing 68a of the machine tool housing 64a in a direction pointing away from the gearing housing 68a, said direction running at least substantially parallel to a main direction of extent 70a of the portable machine tool 12a, as far as a side 72a of the machine tool housing 64a at which the portable machine tool 12a has a power supply cable arranged thereon. The main handle 66a is fixed to a motor housing 74a of the machine tool housing 64a. Here, it is conceivable for the main handle 66a to be connected to the motor housing 74a via a handle damping unit (not illustrated in any more detail here).

Out of the gearing housing 68a there extends a spindle 16a of a drive output unit 56a of the machine tool brake device 10a (FIG. 2), to which spindle a machining tool 18a for the machining of a workpiece (not illustrated in any more detail here) can be fixed. The machining tool 18a is in the form of a grinding disk. It is however also conceivable for the machining tool 18a to be in the form of a cutting or polishing disk. The machine tool housing 64a comprises the motor housing 74a for accommodating a drive unit 76a of the portable machine tool 12a and the gearing housing 68a for accommodating the drive output unit 56a and the machine tool brake device 10a. The drive unit 76a is provided for driving the machining tool 18a in rotation via the drive output unit 56a. Furthermore, the machining tool 18a can be connected rotationally conjointly to the spindle 16a by means of a fastening element (not illustrated in any more detail here) for the purpose of machining a workpiece. The machining tool 18a can thus be driven in rotation during operation of the portable machine tool 12a. The drive output unit 56a is connected to the drive unit 76a via an as a pinion 78a (FIG. 2) of the drive unit 76a, in a manner already known to a person skilled in the art. Furthermore, an auxiliary handle 80a is arranged on the gearing housing 68a. The auxiliary handle 80a extends transversely with respect to the main direction of extent 70a of the portable machine tool 12a.

Figure 2:
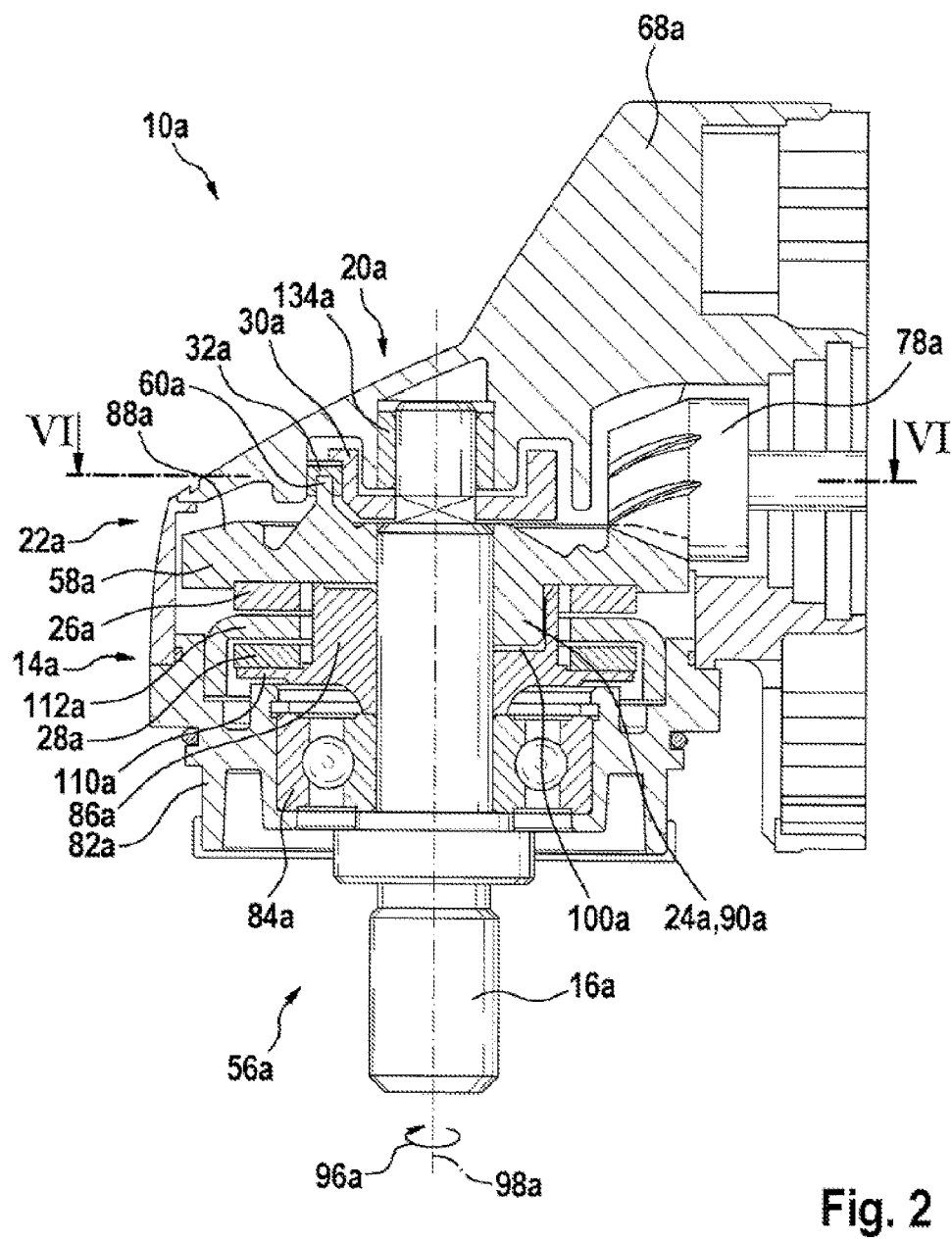
FIG. 2 shows, in a schematic illustration, a detail view of the machine tool brake device according to the disclosure from FIG. 1.

The drive output unit 56a also comprises a bearing flange 82a and a bearing element 84a which is arranged in the bearing flange 82a and which serves for the mounting of the spindle 16a (FIG. 2). The bearing flange 82a can be detachably connected to the gearing housing 68a by means of fastening elements (not illustrated in any more detail here) of the drive output unit 56a. The bearing flange 82a may be of a hybrid type of construction. It is thus possible for the bearing flange 82a to be formed at least partially from plastic and partially from a material that differs from plastic. The material that differs from plastic may in this case be aluminum, steel, carbon, an alloy of one of the stated materials, or some other material that appears expedient to a person skilled in the art. The machine tool brake device 10a furthermore has a detachment-preventing securing means (not illustrated in any more detail here) which is already known to a person skilled in the art and which is provided for preventing a detachment of the machining tool 18a and/or of the fastening element for the fastening of the machining tool 18a from the spindle 16a when the machine tool brake device 10a is in a braking mode. The detachment-preventing securing means may in this case be in the form of a groove which is formed into the spindle 16a. It is however also conceivable for the detachment-preventing securing means to be in the form of a receiving flange which can be connected rotationally conjointly to the spindle 16a by means of a form fit and which has a mode of operation already known to a person skilled in the art.

The machine tool brake device 10a is arranged in the gearing housing 68a of the portable machine tool 12a. Furthermore, the machine tool brake device 10a has at least one magnetic-field-type brake unit 14a for braking the spindle 16a and/or the machining tool 18a when the magnetic-field-type brake unit 14a is in at least one braking position, and at least one spindle immobilization unit 20a for immobilizing the spindle 16a when the spindle immobilization unit 20a is in at least one immobilization position (FIG. 2). In the region of the spindle immobilization unit 20a, the spindle 16a is mounted rotatably in the gearing housing 68a by means of a bearing sleeve 134a of the machine tool brake device 10a. Furthermore, the machine tool brake device 10a has at least one activation unit 22a which is provided for transferring the magnetic-field-type brake unit 14a at least into the braking position and for enabling at least an automatic transfer of the spindle immobilization unit 20a into the immobilization position. The activation unit 22a is provided at least so as to change a characteristic variable of a magnetic field of the magnetic-field-type brake unit 14a as a result of a relative movement. Furthermore, the machine tool brake device 10a comprises the drive output unit 56a, which has the drive output element 58a on which there is arranged at least one brake element 26a, in the form of a permanent magnet, of the magnetic-field-type brake unit 14a. Here, the brake element 26a is fastened rotationally conjointly to the drive output element 58a. The drive output unit 56a is in the form of an angular gear which is coupled, for torque transmission, to the drive unit 76a of the portable machine tool 12a. The magnetic-field-type brake unit 14a is arranged behind the drive output element 58a of the drive output unit 56a as viewed along a power flow proceeding from the drive unit 76a. Here, the drive output element 58a is in the form of a crown gear. The drive output element 58a is in engagement with the pinion 78a of the drive unit 76a when the machine tool brake device 10a is in an assembled state. Furthermore, the drive output element 58a is arranged on the spindle 16a with a clearance fit.

Figure 3:
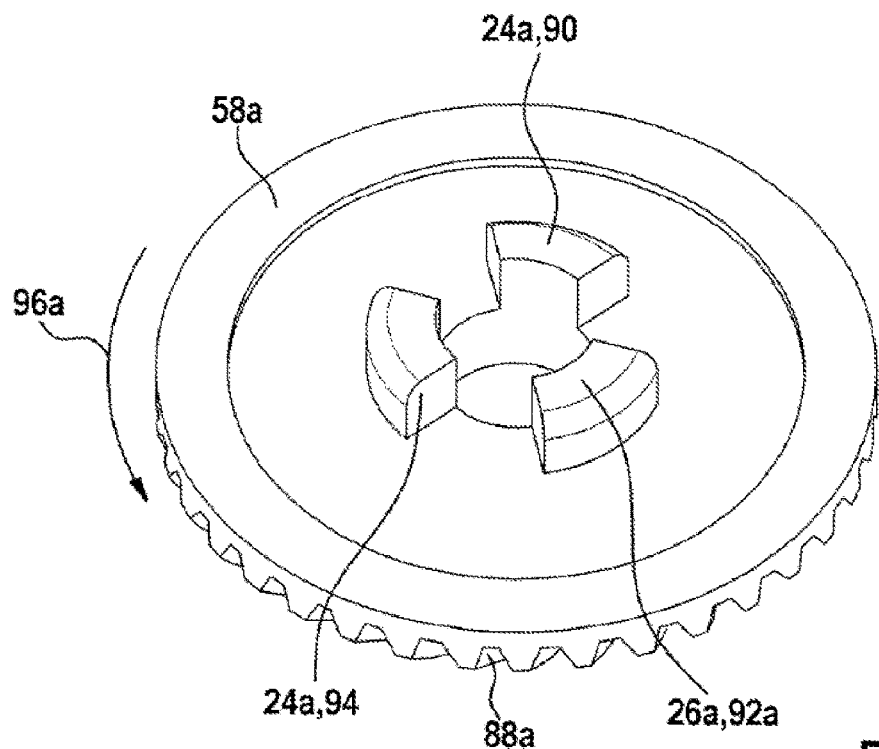
FIG. 3 shows, in a schematic illustration, a detail view of a drive output element of a drive output unit of the machine tool brake device according to the disclosure.

FIG. 3 shows a detail view of the drive output element 58a. The drive output element 58a is formed from a magnetically conductive material, for example a ferromagnetic material. In this way, a magnetic field can be compressed in the region of the drive output element 58a, and leakage flux can be kept low. Furthermore, the drive output element 58a has at least one rotary entrainment element 90a, 92a, 94a on a side of the drive output element 58a which faces away from a toothing 88a of the drive output element 58a. The drive output element 58a has a total of three rotary entrainment elements 90a, 92a, 94a which are arranged on that side of the drive output element 58a which faces away from the toothing 88a of the drive output element 58a. It is however also conceivable for the drive output element 58a to have a number of rotary entrainment elements 90a, 92a, 94a other than three. Depending on the field of use, a person skilled in the art will provide a suitable number of rotary entrainment elements 90a, 92a, 94a on the drive output element 58a. The rotary entrainment elements 90a, 92a, 94a are arranged, so as to be distributed uniformly along a circumferential direction 96a, on that side of the drive output element 58a which faces away from the toothing 88a. Here, the circumferential direction 96a extends in a plane running perpendicular to an axis of rotation 98a of the spindle 16a. During operation for the transmission of torques, the drive output element 58a likewise rotates about the axis of rotation 98a of the spindle 16a. Furthermore, the rotary entrainment elements 90a, 92a, 94a extend perpendicular to that side of the drive output element 58a which faces away from the toothing 88a. When the drive output unit 56a is in an assembled state, the rotary entrainment elements 90a, 92a, 94a extend in the direction of an entrainment element 86a of the magnetic-field-type brake unit 14a (FIG. 2). The entrainment element 86a of the magnetic-field-type brake unit 14a is connected rotationally conjointly to the spindle 16a.

Figure 4:
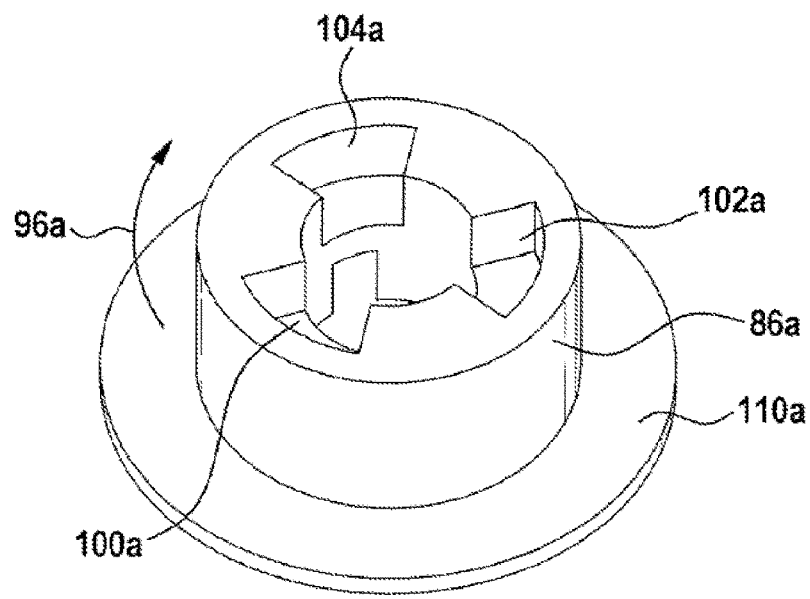
FIG. 4 shows, in a schematic illustration, a detail view of an entrainment element of a magnetic-field-type brake unit of the machine tool brake device according to the disclosure.

FIG. 4 shows a detail view of the entrainment element 86a of the magnetic-field-type brake unit 14a. The entrainment element 86a of the magnetic-field-type brake unit 14a has rotary entrainment recesses 100a, 102a, 104a for receiving the rotary entrainment elements 90a, 92a, 94a. Thus, in an assembled state, the rotary entrainment elements 90a, 92a, 94a extend along the axis of rotation 98a of the spindle 16a from the drive output element 58a into the rotary entrainment recesses 100a, 102a, 104a. The rotary entrainment recesses 100a, 102a, 104a are arranged, so as to be distributed uniformly along the circumferential direction 96a, on the entrainment element 86a of the magnetic-field-type brake unit 14a. Furthermore, the rotary entrainment recesses 100a, 102a, 104a have a greater extent along the circumferential direction 96a than the rotary entrainment elements 90a, 92a, 94a. There is rotational play between the drive output element 58a and the entrainment element 86a of the magnetic-field-type brake unit 14a along the circumferential direction 96a. The rotational play is formed by an angle range through which the drive output element 58a can be rotated relative to the entrainment element 86a of the magnetic-field-type brake unit 14a. Here, the angle range is formed by a circle circumference of 360° divided by the number of poles of the brake element 26a in the form of a permanent magnet. The rotary entrainment elements 90a, 92a, 94a can thus be moved along the circumferential direction 96a in the rotary entrainment recesses 100a, 102a, 104a relative to edge regions of the rotary entrainment recesses 100a, 102a, 104a. When the rotary entrainment elements 90a, 92a, 94a bear against edge regions of the rotary entrainment recesses 100a, 102a, 104a, the entrainment element 86a of the magnetic-field-type brake unit 14a couples the drive output element 58a rotationally conjointly to the spindle 16a. The relative movement of the drive output element 58a relative to the entrainment element 86a of the magnetic-field-type brake unit 14a is utilized by the activation unit 22a for changing a characteristic variable of a magnetic field of the magnetic-field-type brake unit 14a. It is however also conceivable for the rotary entrainment elements 90a, 92a, 94a to be arranged on the entrainment element 86a of the magnetic-field-type brake unit 14a and for the rotary entrainment recesses 100a, 102a, 104a to be arranged on the drive output element 58a. The rotary entrainment elements 90a, 92a, 94a of the drive output element 58a and the rotary entrainment recesses 100a, 102a, 104a of the entrainment element 86a of the magnetic-field-type brake unit 14a thus form a part of the activation unit 22a. The rotary entrainment elements 90a, 92a, 94a form in each case one activation element 24a of the activation unit 22a. The activation unit 22a thus has at least one activation element 24a arranged on the spindle 16a. The activation element 24a formed by one of the rotary entrainment elements 90a, 92a, 94a is mounted on the spindle 16a so as to be rotatable relative to the spindle 16a along at least an angle range of less than 360°. The machine tool brake device 10a thus comprises at least the drive output unit 56a which has at least the drive output element 58a, on which at least the activation element 24a of the activation unit 22a is arranged for the purpose of transferring the magnetic-field-type brake unit 14a into the braking position.

Figure 5:
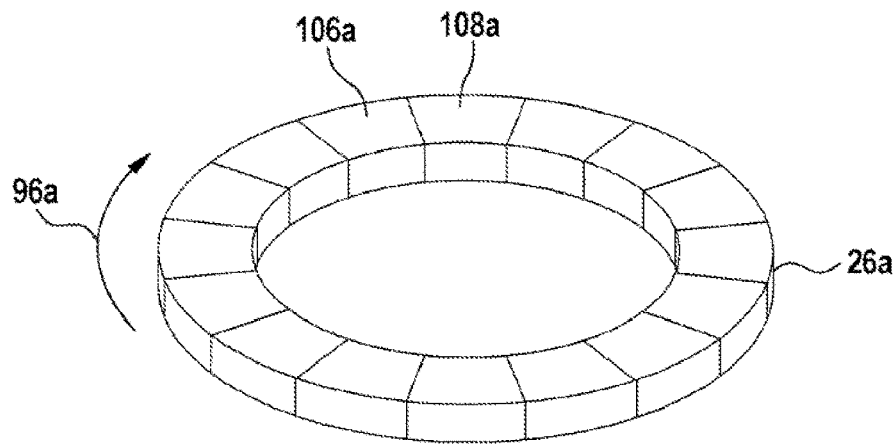
FIG. 5 shows, in a schematic illustration, a detail view of a brake element, in the form of a permanent magnet, of the magnetic-field-type brake unit.

Furthermore, the brake element 26a which is connected rotationally conjointly to the drive output element 58a is of circular-ring-shaped form (FIG. 5). Here, the brake element 26a is arranged on that side of the drive output element 58a which faces away from the toothing 88a. Furthermore, the brake element 26a which is in the form of a permanent magnet has angle segments 106a, 108a distributed uniformly along the circumferential direction 96a. The angle segments 106a, 108a have polarities that alternate relative to one another along the circumferential direction 96a. Along the circumferential direction 96a, the polarities alternate continuously between magnetic north pole and magnetic south pole. The magnetic-field-type brake unit 14a has a further brake element 28a in the form of a permanent magnet. The further brake element 28a is of circular-ring-shaped form and has angle segments (not illustrated in any more detail here) distributed uniformly along the circumferential direction 96a. Furthermore, the further brake element 28a in the form of a permanent magnet is arranged rotationally conjointly on the entrainment element 86a of the magnetic-field-type brake unit 14a by means of a magnetic return element 110a. The magnetic return element 110a is provided for compressing a magnetic field of the magnetic-field-type brake unit 14a in the region of the magnetic-field-type brake unit 14a and keeping leakage flux low.

Furthermore, the magnetic-field-type brake unit 14a has an additional brake element 112a which is in the form of an eddy-current element. The magnetic-field-type brake unit 14a is thus in the form of an eddy-current brake unit. It is however also conceivable for the additional brake element 112a to be in the form of a hysteresis element, such that the magnetic-field-type brake unit 14a would be in the form of a hysteresis brake unit. The additional brake element 112a is formed from an electrically conductive material, such as for example aluminum and/or copper. Furthermore, the additional brake element 112a is arranged axially between the brake element 26a and the further brake element 28a along the axis of rotation 98a of the spindle 16a. It is however also conceivable for the additional brake element 112a to be arranged radially between the brake element 26a and the further brake element 28a. The additional brake element 112a is fixedly connected to the bearing flange 82a. The brake element 26a and the further brake element 28a are thus moved relative to the additional brake element 112a by means of the spindle 16a during operation of the portable machine tool 12a. To prevent a magnetic short circuit, the entrainment element 86a of the magnetic-field-type brake unit 14a and the spindle 16a are formed from a non-magnetizable material, such as for example high-grade steel etc.

When the portable machine tool 12a is in a rest state, the magnetic-field-type brake unit 14a is in a braking mode. In the braking mode, in each case oppositely oriented polarities of the angle segments 106a, 108a of the brake element 26a and of the angle segments of the further brake element 28a are situated opposite one another as viewed along the axis of rotation 98a of the spindle 16a. Upon a start of operation of the portable machine tool 12a by energization of the drive unit 76a, the drive output element 58a is driven by the pinion 78a. Here, the drive output element 58a is rotated relative to the entrainment element 86a of the magnetic-field-type brake unit 14a about the axis of rotation 98a of the spindle 16a until the rotary entrainment elements 90a, 92a, 94a bear against edge regions of the rotary entrainment recesses 100a, 102a, 104a. The drive output element 58a is hereby coupled rotationally conjointly to the spindle 16a. As a result, the spindle 16a is driven in rotation. The machining tool 18a fastened to the spindle 16a is thus likewise driven in rotation. During operation of the portable machine tool 12a, low magnetic forces act on the additional brake element 112a in the form of eddy-current element. To reduce the magnetic forces, it is also conceivable that, by means of the activation unit 22a, the brake element 26a and the further brake element 28a are moved in translatory fashion relative to one another along the axis of rotation 98a of the spindle 16a, in addition to the rotation relative to one another. Here, a distance between the brake element 26a and the further brake element 28a can be varied. It is for example possible for a groove to be provided on the spindle 16a, which groove has a mathematically defined gradient along the axis of rotation 98a of the spindle 16a. A stroke element, for example, could engage into the groove. As a result of a relative movement about the axis of rotation 98a of the spindle 16a, the brake element 26a could be moved relative to the further brake element 28a in a direction pointing away from the entrainment element 86a of the magnetic-field-type brake unit 14a.

As a result of the relative movement between the drive output element 58a and the entrainment element 86a of the magnetic-field-type brake unit 14a, the brake element 26a is rotated relative to the further brake element 28a. As a result, the magnetic-field-type brake unit 14a is switched into an operating mode in which low magnetic forces of the magnetic-field-type brake unit 14a act on the additional brake element 112a. Upon a transition from a braking mode into an operating mode, the activation unit 22a changes a pole position of the brake element 26a relative to the further brake element 28a. The activation unit 22a is thus provided for changing at least a position of the brake element 26a of the magnetic-field-type brake unit 14a relative to the further brake element 28a of the magnetic-field-type brake unit 14a. In the operating mode, therefore, in each case identically oriented polarities of the angle segments 106a, 108a of the brake element 26a and of the angle segments of the further brake element 28a are situated opposite one another as viewed along the axis of rotation 98a of the spindle 16a.

When the portable machine tool 12a is switched off, the pinion 78a is braked by the drive unit 76a. The pinion 78a is thus no longer driven by the drive unit 76a. The machining tool 18a fastened to the spindle 16a continues to rotate owing to mass inertia. The spindle 16a is thus likewise rotated further about the axis of rotation 98a. The machining tool 18a exhibits greater mass moments of inertia than the pinion 78a. The pinion 78a thus brakes the drive output element 58a. The drive output element 58a is rotated relative to the entrainment element 86a of the magnetic-field-type brake unit 14a about the axis of rotation 98a of the spindle 16a until the rotary entrainment elements 90a, 92a, 94a bear against edge regions of the rotary entrainment recesses 100a, 102a, 104a. The magnetic-field-type brake unit 14a is hereby switched into a braking mode. The brake element 26a and the further brake element 28a are rotated relative to one another. Here, the brake element 26a is rotated relative to the further brake element 28a until in each case oppositely oriented polarities of the angle segments 106a, 108a of the brake element 26a and of the angle segments of the further brake element 28a are situated opposite one another as viewed along the axis of rotation 98a of the spindle 16a. In this way, a voltage is induced in the additional brake element 112a. The induced voltage causes a flow of current in a swirling manner, perpendicular to a magnetic flux of the magnetic-field-type brake unit 14a. Eddy currents are hereby formed. The eddy currents generate in the additional brake element 112a a magnetic field which counteracts a magnetic field of the brake element 26a and of the further brake element 28a. In this way, a braking torque is generated which brakes the brake element 26a, which rotates with the spindle 16a relative to the additional brake element 112a, and the further brake element 28a. The spindle 16a and the machining tool 18a are thus likewise braked. A strength of the magnetic field of the magnetic-field-type brake unit 14a and thus a propagation of a magnetic flux of the magnetic-field-type brake unit 14a for the generation of the braking torque is dependent on a distance along the axis of rotation 98a of the spindle 16a between the brake element 26a and the further brake element 28a, and on a pole position of the brake element 26a and of the further brake element 28a relative to one another along the circumferential direction 96a.

Figure 6:
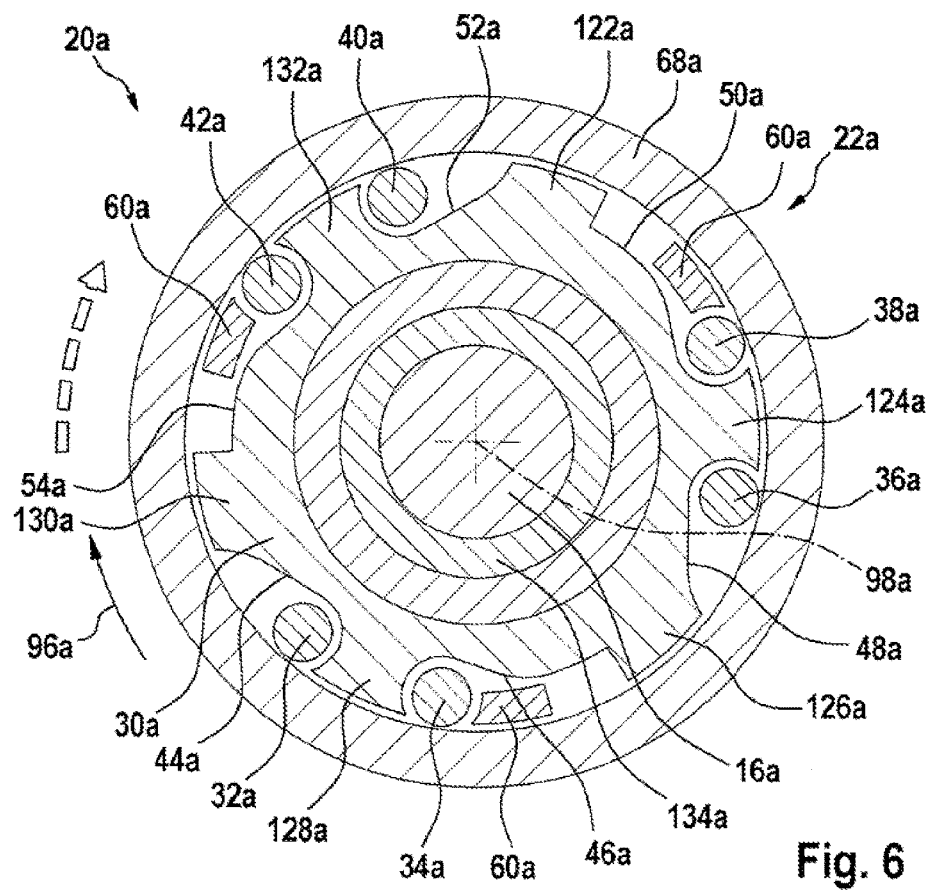
FIG. 6 shows, in a schematic illustration, a sectional view of a spindle immobilization unit of the machine tool brake device according to the disclosure along the line VI-VI from FIG. 2.
Figure 7:
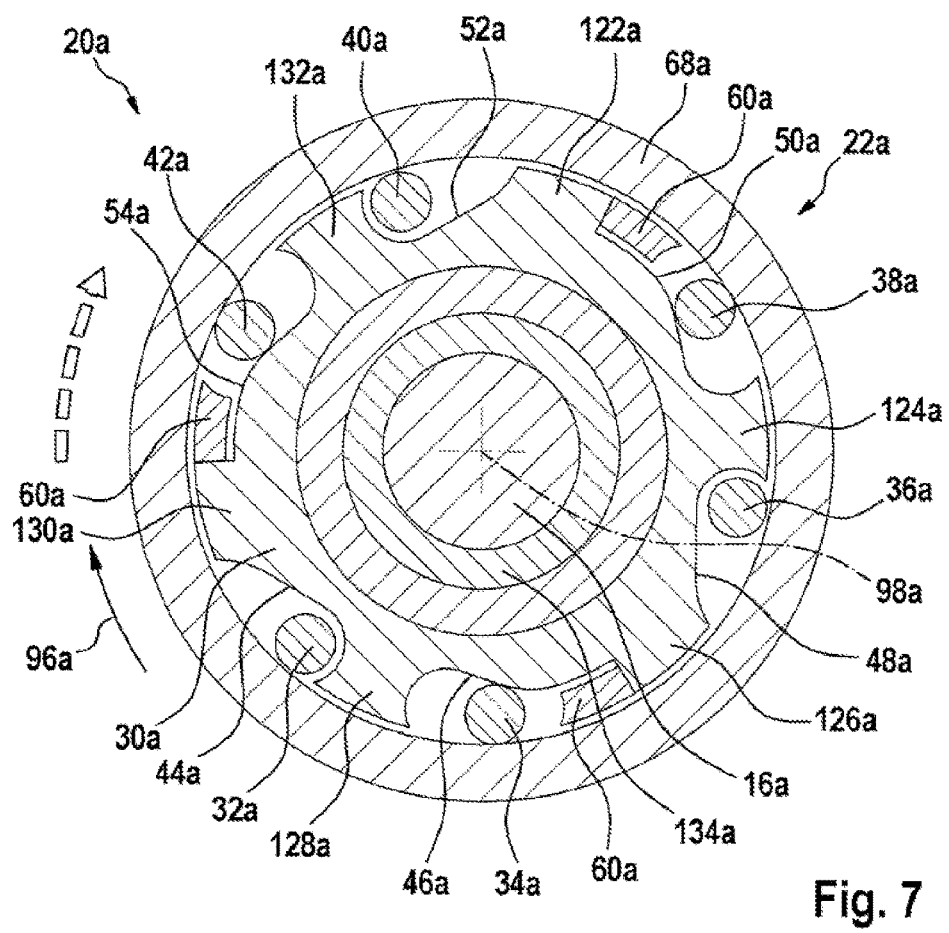
FIG. 7 shows, in a schematic illustration, a detail view of the spindle immobilization unit in an immobilization position as a result of a rotation along a drive direction of rotation of a spindle.
Figure 8:
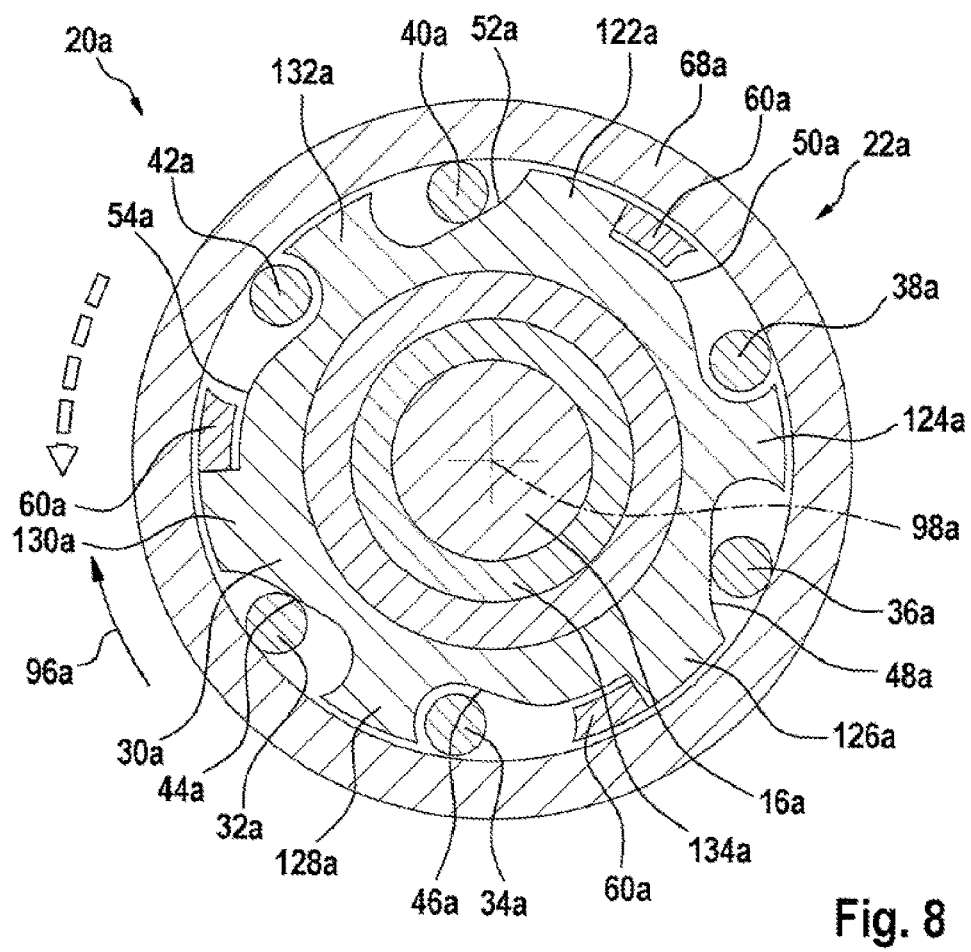
FIG. 8 shows, in a schematic illustration, a detail view of the spindle immobilization unit in an immobilization position as a result of a rotation counter to the drive direction of rotation of the spindle.

If, after the spindle 16a and the machining tool 18a have come to a standstill, the spindle 16a is rotated about the axis of rotation 98a of the spindle 16a in order for the machining tool 18a to be exchanged, the spindle immobilization unit 20a is transferred into the immobilization position. For this purpose, the spindle immobilization unit 20a comprises at least one entrainment element 30a which is provided for moving at least one spindle immobilization element 32a, 34a, 36a, 38a, 40a, 42a of the spindle immobilization unit 20a. The spindle immobilization unit 20a has a total of six spindle immobilization elements 32a, 34a, 36a, 38a, 40a, 42a (FIGS. 6 to 8). It is however also conceivable for the spindle immobilization unit 20a to have a number of spindle immobilization elements 32a, 34a, 36a, 38a, 40a, 42a other than six. The spindle immobilization elements 32a, 34a, 36a, 38a, 40a, 42a are in each case in the form of a rolling element. The entrainment element 30a of the spindle immobilization unit 20a is arranged on the spindle 16a on a side of the drive output element 58a which faces away from the entrainment element 86a of the magnetic-field-type brake unit 14a. Here, the entrainment element 30a of the spindle immobilization unit 20a is connected rotationally conjointly to the spindle 16a. Furthermore, the activation unit 22a comprises at least one further activation element 60a at least for enabling a movement capability of one of the spindle immobilization elements 32a, 34a, 36a, 38a, 40a, 42a, arranged on the drive output element 58a, of the spindle immobilization unit 20a. The activation unit 22a has a total of three further activation elements 60a which are arranged on the drive output element 58a so as to be distributed uniformly along the circumferential direction 96a (FIGS. 2 and 6 to 8). The activation elements 60a are in the form of projections. Here, the activation elements 60a are formed integrally with the drive output element 58a. It is however also conceivable for the activation elements 60a to be formed separately from the drive output element 58a and to be fixed to the drive output element 58a by means of fastening elements that appear expedient to a person skilled in the art. The activation elements 60a extend proceeding from the drive output element 58a in the direction of the entrainment element 30a of the spindle immobilization unit 20a, at least substantially parallel to the axis of rotation 98a of the spindle 16a.

The entrainment element 30a of the spindle immobilization unit 20a comprises at least one clamping contour 44a, 46a, 48a, 50a, 52a, 54a for the purpose of clamping at least one of the spindle immobilization elements 32a, 34a, 36a, 38a, 40a, 42a of the spindle immobilization unit 20a. The entrainment element 30a of the spindle immobilization unit 20a has a total of six clamping contours 44a, 46a, 48a, 50a, 52a, 54a. It is however also conceivable for the entrainment element 30a of the spindle immobilization unit 20a to have a number of clamping contours 44a, 46a, 48a, 50a, 52a, 54a other than six. The clamping contours 44a, 46a, 48a, 50a, 52a, 54a are arranged on the entrainment element 30a of the spindle immobilization unit 20a so as to be distributed uniformly along the circumferential direction 96a. Here, the clamping contours 44a, 46a, 48a, 50a, 52a, 54a are arranged on an outer circumference, running along the circumferential direction 96a, of the entrainment element 30a of the spindle immobilization unit 20a. The clamping contours 44a, 46a, 48a, 50a, 52a, 54a have a ramp-shaped configuration. The clamping contours 44a, 46a, 48a, 50a, 52a, 54a thus each have a geometric configuration which, along the circumferential direction 96a, has a mathematically defined gradient, wherein the gradient has a non-zero value.

Figure 9:
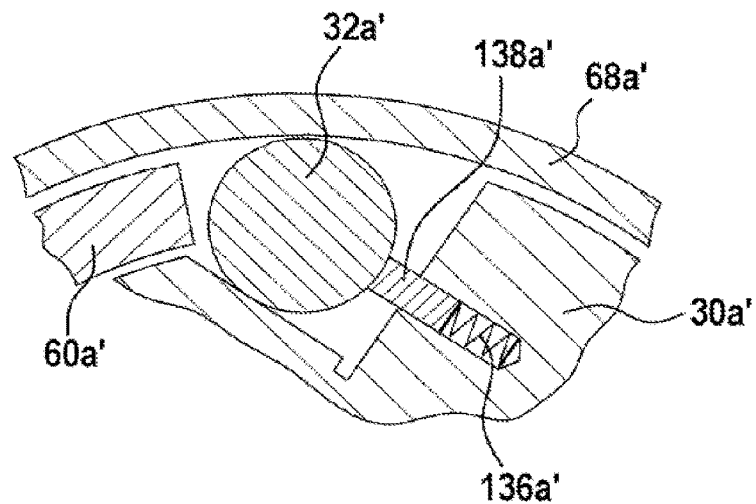
FIG. 9 shows, in a schematic illustration, a detail view of an alternative configuration of an entrainment element of a spindle immobilization unit of an alternative machine tool brake device according to the disclosure.

The spindle immobilization elements 32a, 34a, 36a, 38a, 40a, 42a are moved relative to the spindle 16a along a direction running at least substantially perpendicular to the axis of rotation 98a of the spindle 16a, and along the circumferential direction 96a, by means of the clamping contours 44a, 46a, 48a, 50a, 52a, 54a of the entrainment element 30a of the spindle immobilization unit 20a. In this way, the spindle immobilization elements 32a, 34a, 36a, 38a, 40a, 42a are clamped between the clamping contours 44a, 46a, 48a, 50a, 52a, 54a of the entrainment element 30a of the spindle immobilization unit 20a and an inner wall, facing toward the spindle immobilization unit 20a, of the gearing housing 68a. A rotational movement of the spindle 16a is thus prevented. It is however also conceivable here for the spindle immobilization elements 32a, 34a, 36a, 38a, 40a, 42a to be preloaded in the direction of a clamping position in each case by means of a force, in particular a spring force, and to be moved into the clamping position owing to the force upon an activation of a transfer of the spindle immobilization unit 20a (cf. FIG. 9). Here, on each spindle immobilization element 32a', 34a', 36a', 38a', 40a', 42a', there may be arranged a guide projection 138a' which engages into a recess of the entrainment element 30a' and which is acted on by a spring element 136a'. Upon a start of operation of the portable machine tool 12a, at least three of the spindle immobilization elements 32a, 34a, 36a, 38a, 40a, 42a are, by means of the activation elements 60a, moved out of a clamping position between the inner wall of the gearing housing 68a and the clamping contours 44a, 46a, 48a, 50a, 52a, 54a as a result of a rotation of the drive output element 58a relative to the entrainment element 30a of the spindle immobilization unit 20a caused by a drive force acting on the drive output element 58a.

The remaining spindle immobilization elements 32a, 34a, 36a, 38a, 40a, 42a are, as a result of a rotational movement of the entrainment element 30a of the spindle immobilization unit 20a, positioned relative to the inner wall of the gearing housing 68a in such a position that a clamping action between the inner wall of the gearing housing 68a and the clamping contours 44a, 46a, 48a, 50a, 52a, 54a is eliminated (FIG. 6). For this purpose, the entrainment element 30a of the spindle immobilization unit 20a has at least one projection 122a, 124a, 126a, 128a, 130a, 132a (FIGS. 6 to 8). The projection 122a, 124a, 126a, 128a, 130a, 132a is in this case in the form of a radial projection. The entrainment element 30a of the spindle immobilization unit 20a has a total of six projections 122a, 124a, 126a, 128a, 130a, 132a which are in the form of radial projections. The spindle immobilization unit 20a is thus provided for permitting an immobilization of the spindle 16a, as a result of a rotational movement, in two opposite directions in order for the machining tool 18a to be exchanged (cf. FIGS. 7 and 8). Here, one direction of rotation is indicated in the figures by dashed lines. Thus, upon an immobilization of the spindle 16a in order for the machining tool 18a to be exchanged, when the spindle immobilization unit 20a is in the immobilization position, in each case three spindle immobilization elements 32a, 34a, 36a, 38a, 40a, 42a are clamped between the clamping contours 44a, 46a, 48a, 50a, 52a, 54a and the inner wall of the gearing housing 68a in a manner dependent on a direction of rotation.

Figure 10:
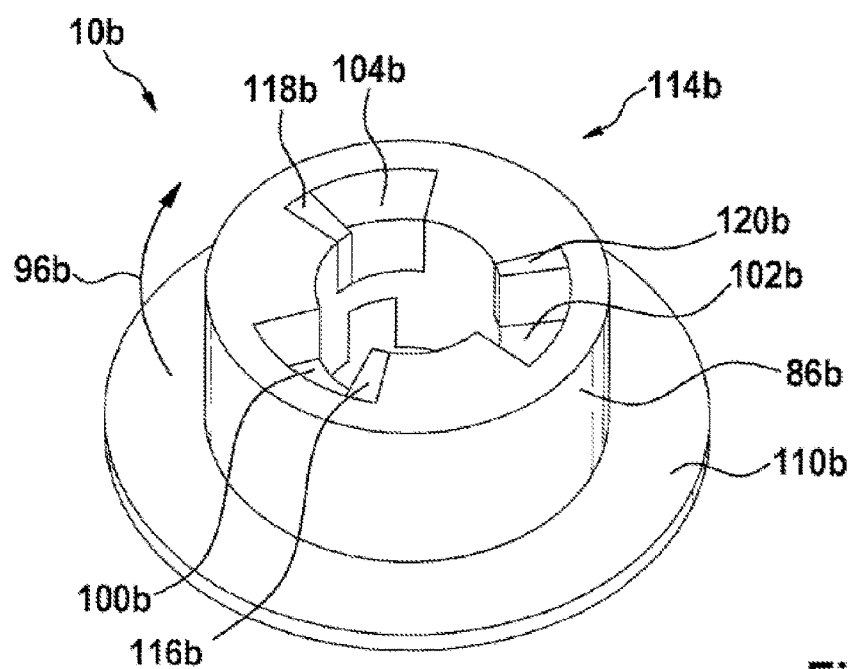
FIG. 10 shows, in a schematic illustration, a detail view of a further alternative machine tool brake device according to the disclosure having a damping unit.

FIG. 10 illustrates an alternative exemplary embodiment. Substantially identical components, features and functions are basically denoted by the same reference signs. To distinguish between the exemplary embodiments, the reference signs of the exemplary embodiments are suffixed by the letters a and b. The following description is restricted substantially to the differences with respect to the first exemplary embodiment described in FIGS. 1 to 9, wherein with regard to identical components, features and functions, reference may be made to the description of the first exemplary embodiment in FIGS. 1 to 9.

FIG. 10 shows a detail view of an entrainment element 86b of a magnetic-field-type brake unit 14b of a machine tool brake device 10b. The machine tool brake device 10b may in this case be arranged in a portable machine tool (not illustrated in any more detail here) that has a configuration at least substantially analogous to the portable machine tool 12a described in FIGS. 1 to 9. By contrast to the machine tool brake device 10a described in FIGS. 1 to 9, the machine tool brake device 10b from FIG. 10 comprises at least one damping unit 114 for damping torque shocks. Here, the damping unit 114b comprises at least one damping element 116b, 118b, 120b which is provided for damping vibrations in a drive output unit (not illustrated in any more detail here) of the machine tool brake device 10b. The damping element 116b, 118b, 120b may in this case be formed from an elastomer, from a gel cushion with viscous liquid or from some other material that appears expedient to a person skilled in the art. The damping unit 114b comprises a total of three damping elements 116b, 118b, 120b. It is however also conceivable for the damping unit 114b to comprise a number of damping elements 116b, 118b, 120b other than three. Here, the damping elements 116b, 118b, 120b are arranged in each case in a rotary entrainment recess 100b, 102b, 104b of the entrainment element 86b of the magnetic-field-type brake unit 14b. Here, the damping elements 116b, 118b, 120b are arranged, as viewed along a circumferential direction 96b, in each case between an edge region of the rotary entrainment recess 100b, 102b, 104b and a rotary entrainment element (not illustrated in any more detail here), which engages into the respective rotary entrainment recess 100b, 102b, 104b, of the magnetic-field-type brake unit 14b. In an alternative configuration (not illustrated here) of the machine tool brake device 10b, in each case two damping elements 116b, 118b, 120b are arranged in a rotary entrainment recess 100b, 102b, 104b, wherein in each case one rotary entrainment element is arranged, as viewed along the circumferential direction 96b, between the two damping elements 116b, 118b, 120b in the respective rotary entrainment recess 100b, 102b, 104b. With regard to further features and functions of the machine tool brake device 10b, reference may be made to the machine tool brake device 10b described in FIGS. 1 to 9.

What is claimed is:

1. A machine tool brake device of a portable machine tool, comprising:
   at least one magnetic-field-type brake unit configured to brake one or more of a spindle and a machining tool when the magnetic-field-type brake unit is in at least one braking position;
   at least one spindle immobilization unit separate from the at least one magnetic-field-type brake unit and configured to immobilize the spindle when the spindle immobilization unit is in at least one immobilization position; and
   at least one activation unit configured to transfer the magnetic-field-type brake unit at least into the braking position and to enable automatically at least a transfer of the spindle immobilization unit into the immobilization position.

2. The machine tool brake device according to claim 1, wherein the activation unit comprises at least one activation element arranged on the spindle.

3. The machine tool brake device according to claim 1, wherein the activation unit comprises at least one activation element mounted on the spindle so as to be rotatable relative to the spindle along at least an angle range of less than 360°.

4. The machine tool brake device according to claim 1, wherein the activation unit is configured to change at least a position of one brake element of the magnetic-field-type brake unit relative to a further brake element of the magnetic-field-type brake unit.

5. The machine tool brake device according to claim 1, wherein the spindle immobilization unit comprises at least one entrainment element configured to move at least one spindle immobilization element of the spindle immobilization unit.

6. The machine tool brake device according to claim 1, wherein the spindle immobilization unit comprises at least one entrainment element having at least one clamping contour configured to clamp at least one spindle immobilization element of the spindle immobilization unit.

7. The machine tool brake device according to claim 1, wherein the spindle immobilization unit comprises at least one spindle immobilization element configured in the form of a rolling element.

8. The machine tool brake device according to claim 1, further comprising at least one drive output unit including at least one drive output element, wherein the activation unit includes at least one activation element arranged on the drive output element and configured to transfer the magnetic-field-type brake unit into the braking position.

9. The machine tool brake device according to claim 8, wherein the activation unit comprises at least one further activation element arranged on the drive output element and configured at least to enable a movement capability of a spindle immobilization element of the spindle immobilization unit.

10. A portable machine tool, comprising:
    at least one machine tool brake device including:
      at least one magnetic-field-type brake unit configured to brake one or more of a spindle and a machining tool when the magnetic-field-type brake unit is in at least one braking position;
      at least one spindle immobilization unit separate from the at least one magnetic-field-type brake unit and configured to immobilize the spindle when the spindle immobilization unit is in at least one immobilization position; and
      at least one activation unit configured to transfer the magnetic-field-type brake unit at least into the braking position and to enable automatically at least a transfer of the spindle immobilization unit into the immobilization position.

11. The portable machine tool according to claim 10, wherein the portable machine tool is configured as an angle grinder.

* * * * *